Sept. 29, 1970     H. G. PRESTON ET AL     3,531,117
BOWLING SCOREKEEPER APPARATUS
Filed Aug. 13, 1965     4 Sheets-Sheet 1
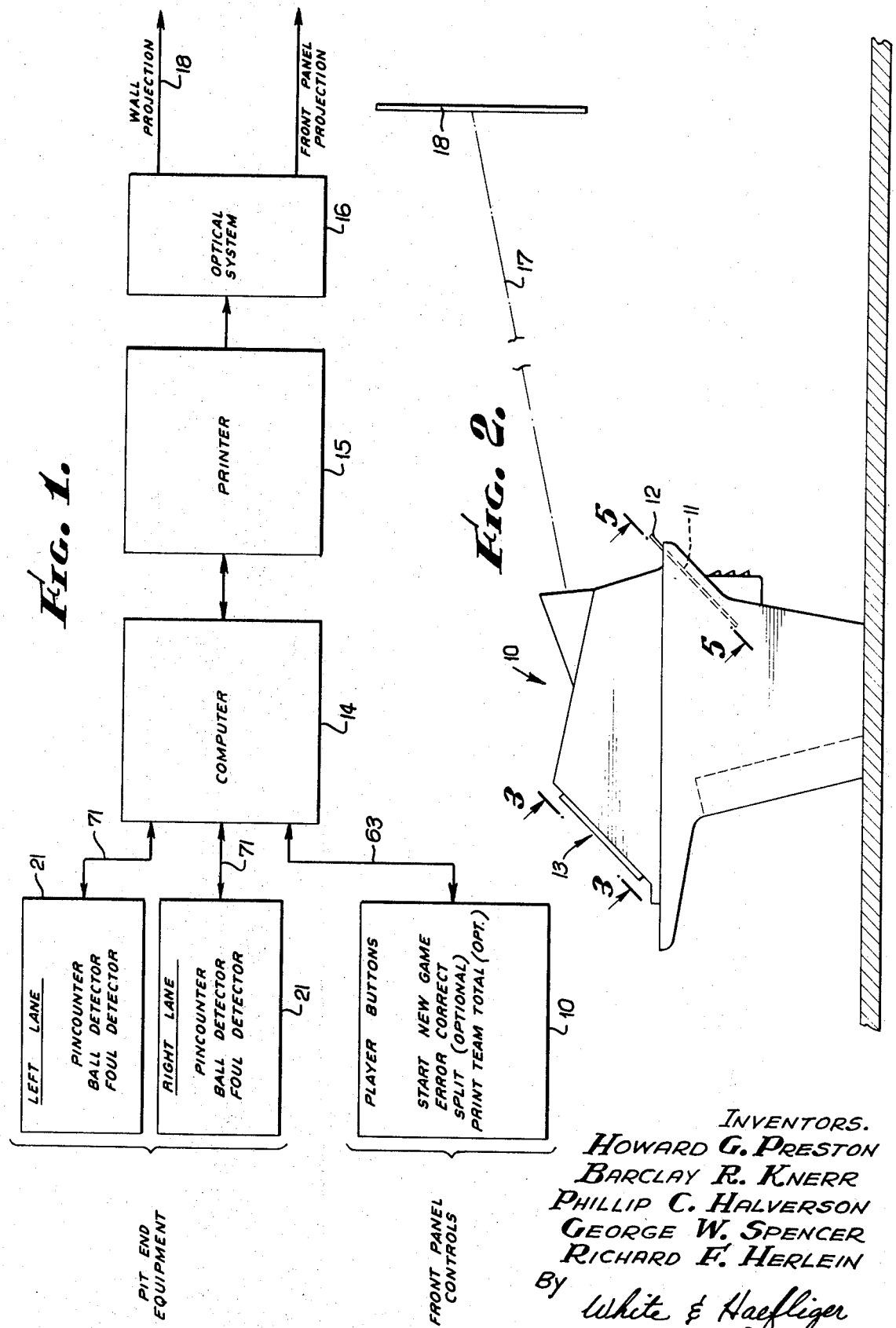
INVENTORS.
HOWARD G. PRESTON
BARCLAY R. KNERR
PHILLIP C. HALVERSON
GEORGE W. SPENCER
RICHARD F. HERLEIN
By White & Haefliger
ATTORNEYS.

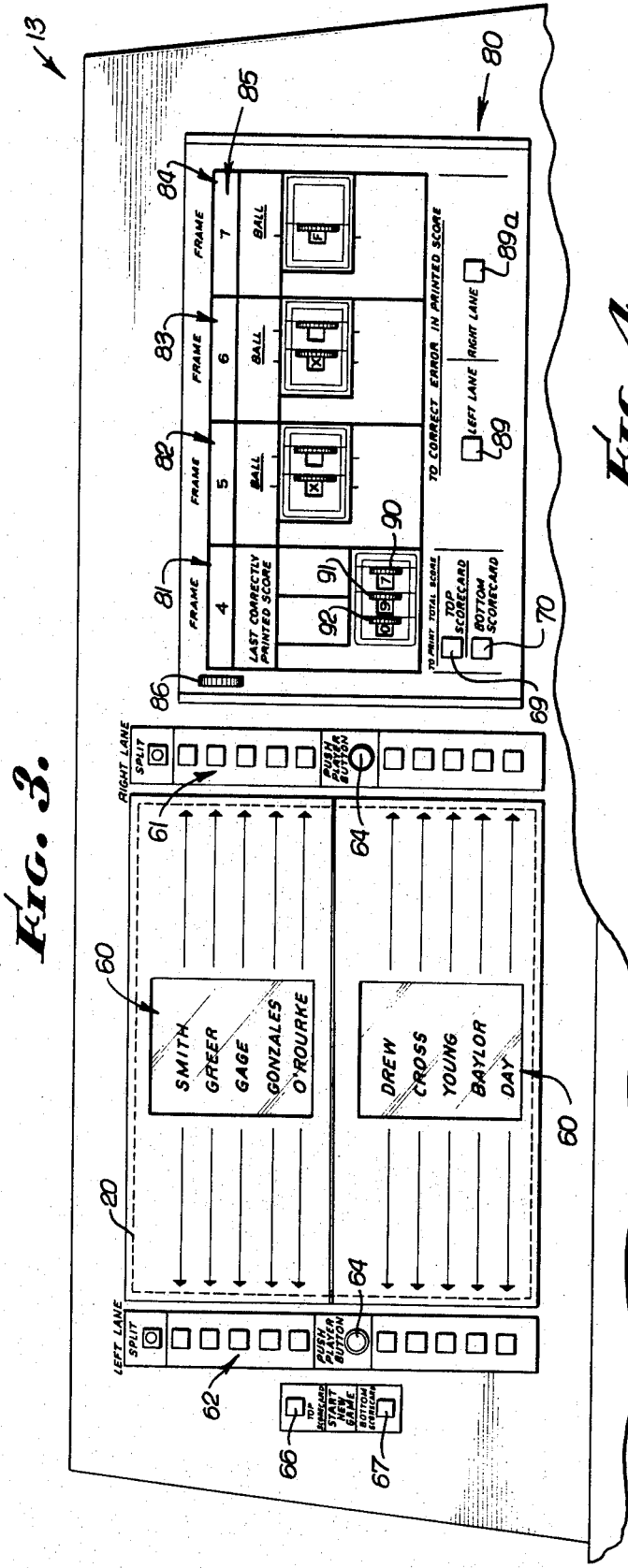

INVENTORS.
HOWARD G. PRESTON
BARCLAY R. KNERR
PHILLIP C. HALVERSON
GEORGE W. SPENCER
RICHARD F. HERLEIN

By White & Haefliger
ATTORNEYS.

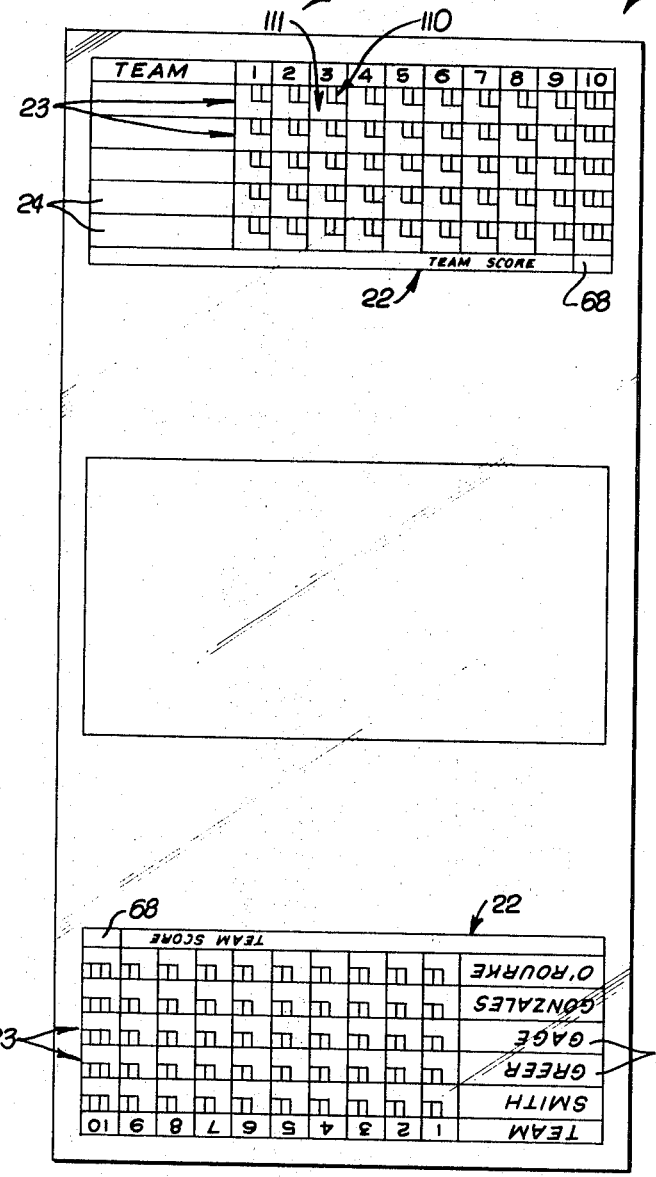
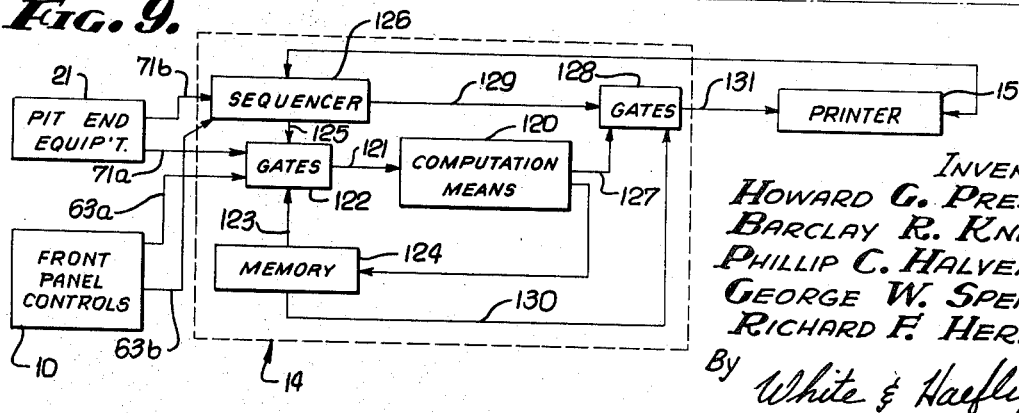

United States Patent Office 3,531,117
Patented Sept. 29, 1970

3,531,117
BOWLING SCOREKEEPER APPARATUS
Howard G. Preston, Whittier, and Barclay R. Knerr and Phillip C. Halverson, Fullerton, George W. Spencer, Inglewood, and Richard F. Herlein, Fullerton, Calif., assignors to Brite-Lite Corporation of America, Phoenix, Ariz., a corporation of Delaware
Filed Aug. 13, 1965, Ser. No. 479,511
Int. Cl. A63d 5/00
U.S. Cl. 273—54                                20 Claims

ABSTRACT OF THE DISCLOSURE

A bowling score computing system including a score correction apparatus having a manually adjustable sequential frame number display. Associated with the frame display is a selector for indicating the correct cumulative score for a given frame and additional selectors for indicating the pitfall occurring in a plurality of frames subsequent to the given frame. Upon actuation of the computer, the above noted correct cumulative score is printed in the appropriate frame space of a score card and the computer prints the pinfall counts in the score card pinfall boxes and computes and prints the correct cumulative score for the subsequent frames for which the pinfall has been indicated by the additional selectors.

This invention relates generally to bowling equipment, and more particularly concerns unusually advantageous and effective automatic bowling scorekeeping equipment.

While attempts have been made in the past to automate bowling scorekeeping, none of such attempts have resulted in the provision of equipment exhibiting the unusual combinations and sub-combinations of features, advantages and results which are characteristic of the present invention.

Basically, the invention involves the concept of providing for use in an automatic bowling scorekeeper a console having a scorecard receiving zone, automatic printing apparatus carried by the console to print on the card the progressive frame-by-frame score, and means to cause the printing apparatus to print a score on the card, said means including manually operable means at the console to effect manually corrected score printing on the card. More specifically, the last named means typically includes a multiple frame display on the console, and manually operable score selectors associated with the display, and a manually operable frame number selector associated with the display for selecting the number sequence of frames in the display and the scores in which are to be adjusted by the score selectors. Also, the above named means includes electrical circuitry responsive to displacement of a frame number selector body to cause the printer to print in score card frames corresponding to the selected frame number sequence. Typically, the score selectors include units, tens and hundreds digits selectors for one frame of the display to be manually set to a cumulatively correct score, and also one or two individually operable pinfall units digit selectors for each of three additional frames of the display, for reasons as will appear.

Other objects and advantages of the invention include the provision of a scorecard comprising a translucent sheet having multiple rows of frame box indicia thereon, each row including ten frames; light projection means carried by the console to project a light beam through the scorecard and toward a screen; automatic printing apparatus including a printing head and means to effect relative movement of the printing head and scorecard for bringing first the head into printing position and then bringing the head into contact with the scorecard; the provision of a console having two scorecard receiving zones and dual light beam passing translucent windows to support scorecards during printing, the printing head being movable at the sides of the scorecards opposite the windows, and light projection means located to project light along paths extending through the windows and then through the scorecards for dual projection of two bowling team scores printed on the scorecards; and the provision of a computer connected to respond to positioning of the frame number and score selectors, as well as the pit-end equipment, for effecting operation of the printing apparatus.

These and other objects and advantages of the invention, as well as the details of illustrative embodiments, will be more fully understood from the following detailed description of the drawings in which:

FIG. 1 is a block diagram showing the scorekeeper system components;

FIG. 2 is a side elevation illustrating the scorekeeper console;

FIG. 3 is an enlarged front elevation taken on line 3—3 of FIG. 2 and showing the console control panel;

FIG. 4 is a front elevation showing the score correction portion of the console control panel;

FIG. 7 is a front plan view of the scorekeeper scorecard;

FIG. 8 is a developed or extended view of the frame number selector associated with manual score correction;

FIG. 9 is a block diagram showing the scorekeeper computer elements; and

FIGS. 10 and 11 show digital switches associated respectively with the frame number selector and the frame score selectors.

Figure 5:
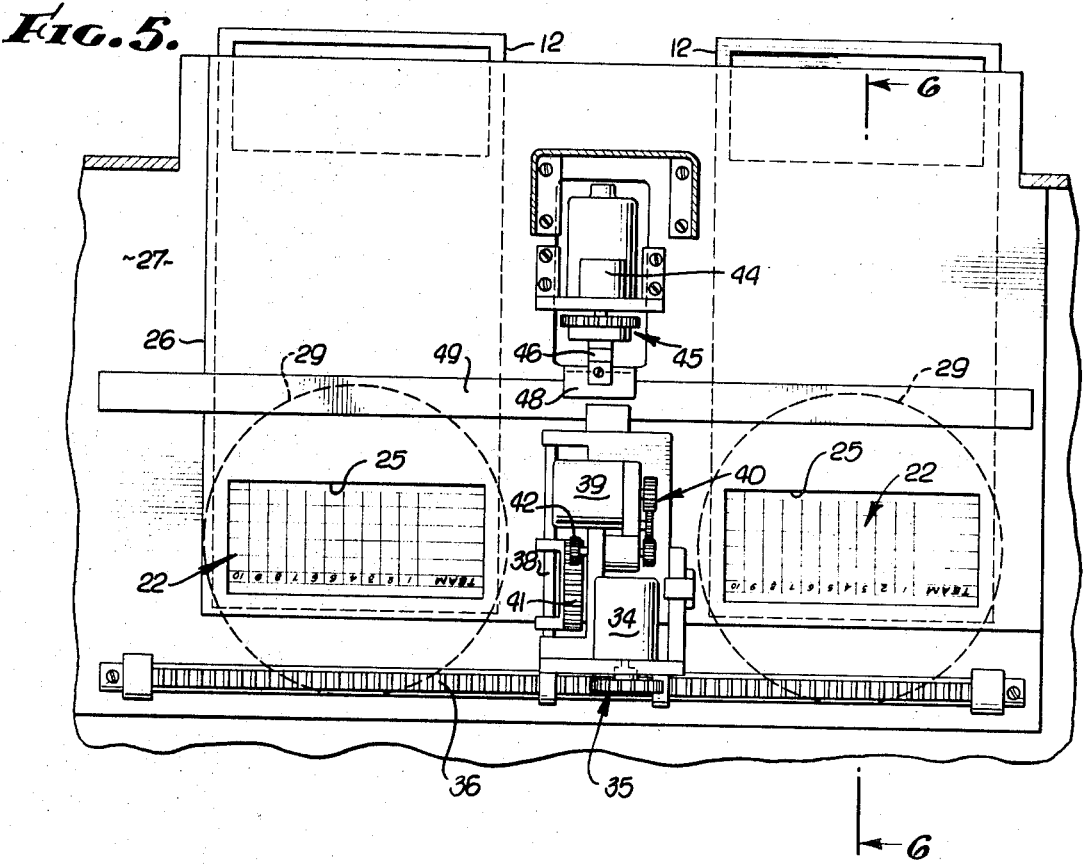
FIG. 5 is an enlarged sectional view taken on line 5—5 of FIG. 2.

Referring first to FIG. 2, it illustrates a console 10 having a zone 11 at the rear thereof for receiving manual insertion of a scorecard 12, better seen in FIG. 7. The console also has a front control panel 13 illustrated in FIG. 3. Contained within the console is a computer designated in block form at 14 in FIG. 1, and in somewhat greater detail in FIG. 9. The console also contains a scorecard printer 15 and optical system 16 represented in block form in FIG. 1, and seen in more detail in FIGS. 5 and 6. In this regard, it will be understood that the optical system projects a light beam through the imprinted score on the scorecard frames, the beam being suitably projected at 17 in FIG. 2 for screening at a wall panel 18. FIG. 1 also shows the optional projection of a similar beam for screening the scorecard at a front panel section of the console, and generally in the broken line area 20 of FIG. 3.

FIGS. 1 and 9 also include blocks 21 representing pit end equipment, typically for both left and right lanes in order to enable use of the scorekeeper for team bowling. One form of such equipment is that described in U.S. Pat. No. 3,140,872 to John G. Bolger.

Referring now to the scorecard 12 seen in FIG. 7, it typically comprises a transparent or translucent plastic sheet having two usable sections 22 of indicia, each representing or indicating five rows of ten frames 23, one row for each player, there being space 24 for writing in the names of the players at the beginnings of the frame rows. In this regard, one team is assigned one section on one card, and another team assigned a section on another card. Once the names are so written, each card is inserted in a zone 11 of the console, and typically onto a downwardly slanted translucent support window 25, as will appear later in greater detail.

Figure 6:
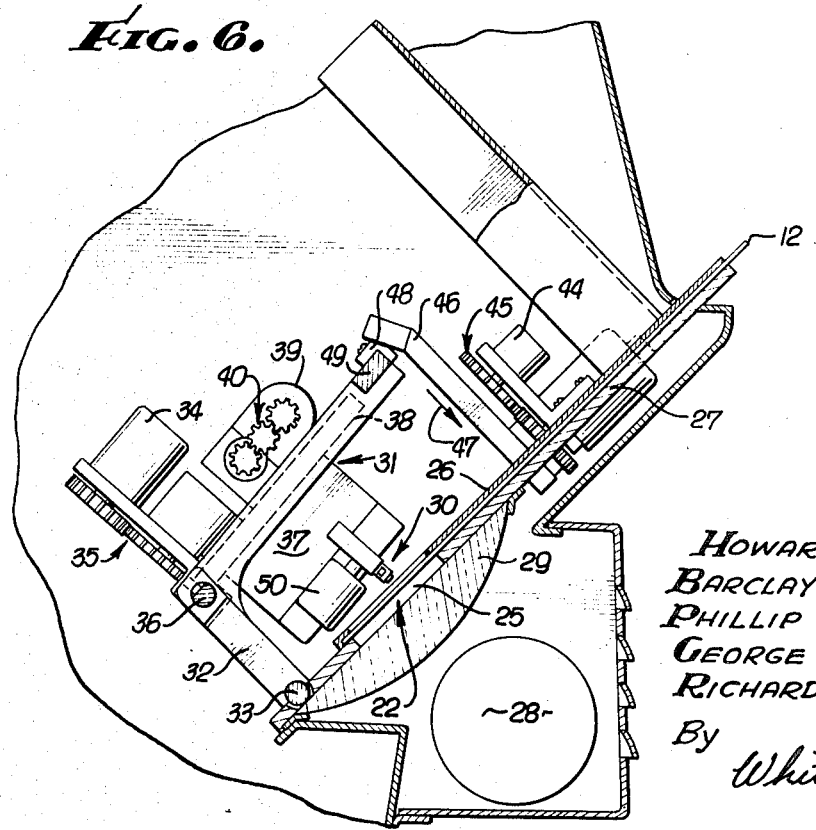
FIG. 6 is a section taken on line 6—6 of FIG. 5.

FIGS. 5 and 6 indicate the use of two such windows 25, one for each of two cards 12 as well as the left and right alleys, there also being card guides 26 spaced above a plate 27 to form the card receiving zones 11 and to locate the cards in correct position. Light projection means including bulb 28 and lens 29 is located to direct light along paths extending through the windows 25 and then through the scorecards for dual simultaneous projection of two bowling team scores printed on the scorecards. When the teams reverse the alleys in which they are bowling, the cards are left in place in zones 11. At the end of a game a card is withdrawn and the opposite end section, or a new card, is inserted.

As mentioned above, the console carries automatic printing apparatus 15 to print on the card section 22 the progressive frame-by-frame score of each player. Means to cause the printing apparatus to print a score on the card may be considered to include the elements 10, 14 and 21 indicated in block form in FIG. 1. FIGS. 5 and 6 show typical printing apparatus 15 to include a printing head 30, together with means for effecting relative movement of the head and scorecard for first bringing the head into printing position and then bringing the printing head into printing contact with the scorecard. The latter means includes a carriage 31 having a frame member 32 movable laterally along a guide rod 33, i.e., parallel to the surface of card 12. Such movement is effected by a carriage motor 34 energizable to drive a gear train 33 which engages a rack 36 parallel to guide rod 33. The carriage also includes a support 37 for the head 30 and which is suspended from a guide rod 38 for movement generally normal to rod 33, yet also generally parallel to the surface of card 12. Support 37 is powered for such movement by a motor 39 driving gear train 40 which has a gear 42 engaging a rack 41 parallel to rod 38.

In addition power mechanism is provided to displace the carriage 31 in a third dimension extending generally normal to the surface of card 12, in order that the head 30 may print a score upon the card. For this purpose, the carriage is typically pivoted to swing about the axis of rod 33, and the power mechanism includes a fixed motor 44 driving gear train 45 serving to depress the actuator link 46 in the direction of arrow 47. Link 46 carries a pad 48 mounting an elongated bar 49 parallel to rod 33 and bearing on the movable carriage elbow 32 in such manner that the latter is swung about the axis of rod 33 when motor 44 is energized, thereby to cause momentary contact of the printing head with the correct frame in the correct players' line of section 22 of the card 12. Previously, a motor 50 on the carriage drives a printing number wheel so that the correct number is printed on the card. Motors 50, 44, 34 and 39 are controlled by the computer 14.

Referring now to FIGS. 3 and 4, the control panel 13 has two player name zones 60 in each of which the names of five players on a team may be entered. To the right and left of each zone are columns 61 and 62 of five player push buttons. Thus, each bowler has the option of using right or left lane buttons depending upon the lane in which he happens to be bowling. The buttons have electrical circuit connection with the computer, as indicated by the cable 63 in FIG. 1, so that when a player pushes the button to the left or right of his name in a zone 60, the computer is programmed to cause the printer to print score entries opposite that player's name on the scorecard as that player bowls. If a player fails to push a button when he bowls, a signal light 64 in the left or right column is flashed on by the computer, in response to detection by equipment 21 of the bowling ball roll.

When a new game is started, button 66 and/or 67 is pushed to instruct the computer via cable 63 (i.e., clearing computer memory). To print the total team score corresponding to the two team scorecard sections as for example in boxes 68 on the two different cards, one of which is seen in FIG. 7, the appropriate one of the buttons 69 and 70 is pushed.

As the player bowls, the pit end equipment, including pin counter and ball detector, operates to transmit signals to the computer as via cables 71 in FIG. 1, and the computer causes the printer to index properly and to print appropriate units, tens, and hundreds digits in the frames opposite the names of the players on the scorecards, as well as spare and strike indicia in the frame upper right hand boxes as seen in FIG. 7.

Coming now to that portion of the description with which the invention is particularly concerned, the means to cause the printing apparatus to print a score on the card 12 includes manually operable means at the console control panel to effect manually corrected score printing on the card. Included within the scope of such means is a multiple frame display such as that generally indicated at 80 in FIGS. 3 and 4, and having frames 81, 82, 83 and 84 in sequence from left to right. Said means also includes a manually operable frame number selector 85 associated with the display for selecting the number sequence of frames 81-84, as for example 4-7 at the tops of the frames in FIG. 3. The selector 85 may comprise a rotary body a rotary portion 86 of which is exposed for manual turning. FIG. 8 shows the unrolled or developed surface 85a of the body, with horizontal rows of indicia thereon representing frame sequences subject to selection. The next to last row has the sequence "8-9-10-AFTER X or /", and the last row has the sequence "9-10-AFTER X or /-AFTER XX" to provide for conditions that may be encountered in bowling a strike or spare in frame 10 and another strike on the next roll.

Each selected rotary position of body 10 is effective to secure transmission of a characteristic signal to the computer via cable 63 seen in FIG. 1. For example, FIG. 10 indicates a stepping switch arm 87 that has 10 positions corresponding to the 10 rows in FIG. 8, there being 10 contacts 88 to be engaged by the arm. Assuming the switch arm is moved to a position to assign frame number 4-7 to the frames 81-84, the score stored in the computer memory for frames 4-10 of the player whose left lane (for example) push button 62 is pushed is erased, at such time as the left lane score correct button 89 is pushed. This operation makes it possible to manually correct the score for frames 4-7, as will now be described.

Located at cumulative score zone of frame 81 are three individually manually operable score selectors 90, 91 and 92, these being included within the means to effect manual correcting of the printed score in case or printing error due to accidental pin knock-down, a foul, etc. Each of these score selectors may be rotary, and has the ten numbers 1 to 9, and 0 arranged for selective display; thus selectors 90, 91 and 92 have units, tens and hundreds digits respectively for selective display, for setting a correct total score in that first error correcting frame 81. For example, the player may know that the score printed on the card in frame 4 was correct, so he enters it in the error correct frame 81.

As seen in FIG. 11, each selector may comprise a manually operable serrated wheel 95 to be manually turned, and which rotates a switch arm 93 that has ten detented positions for engaging nonrotary contacts 94 corresponding to the rotary display numbers 1 to 9 and 0. Again, each contact engaging position of arm 93 is effective to secure transmission of a characteristic signal to the computer via the cable 63 seen in FIG. 1.

Respectively located in the pin count boxes 100 and 101 of frame 82 are two manually operable score selectors 102 and 103, each of these being of the same type as selectors 90-92. Also, similar selectors 104 and 105 are located in the respective pin count boxes 106 and 107 of frame 83. Another selector 108 is located in the pin-count box 109 of frame 84. Each of the rotary selectors 102, 103, 104, 105 and 108 has the numbers 1 to 9, and 0 thereon, and in addition selectors 102, 104 and 108 have the strike symbol "X" thereon, while selectors 103 and 105 have the spare symbol "/" thereon. Accordingly, if the first ball rolled for any frame results in a strike, only that selector with the strike symbol thereon is manually set to display same. If the first ball for a frame results in nine or less pins knocked down, that same selector is set manually to display the number of pins knocked down, or zero if none are knocked down; and if the second ball for that frame results in knock down of the remaining pins standing, the other selector is set to display the spare symbol. If the second ball results in less than a spare, the number of pins knocked down by the second ball is set by the other selector (i.e., selector 103 or 105). As seen in FIG. 4, frame 83 is used primarily to manually select and effect entering or appropriate score into the computer upon rolling of one or two balls after a strike or spare entered in frame 82 (selected as the tenth frame), whereas frame 84 is used to manually select and effect entering of appropriate score into the computer upon rolling of a single ball after strikes entered in frames 82 and 83 where frame 82 has been selected as the tenth frame of a line.

The scores so set in frames 81 to 84 are entered into the computer in response to previous pressing of the appropriate player button in columns 61 or 62, together with pressing of button 89 or 89a immediately below the frames 82–84. This serves not only to erase the players score data in the computer memory but it also causes the printer to print, in the first selected card frame of the sequence, the total score that was entered in corresponding frame 81 in FIGS. 3 and 4; to print the pin-fall counts or spares or strikes in the pin-fall boxes 110 seen in FIG. 7, to correspond to the scores so entered in the boxes of frames 82 to 84; and to print the total scores in the selected card frame zones 111 below the boxes 110, after automatic computation thereof by the computer. As to the latter, pressing of button 89 or 89a also causes the entry into computer memory of the manually entered data. In this regard, the numbers that may have been printed previously in these card frames should first be erased before the manual correction procedure is followed. This is easily done by withdrawing the card 12 at the rear of the console, as seen in FIG. 2, erasing the appropriate numbers, and reentering the card into the console.

Finally, reference is made to FIG. 9 showing the computer 14 of FIG. 1 to have a computation means 120 to which information is fed at 121 from input gates 122. Information flows to the gates at 123 from memory 124, at 125 from sequencer 126, and at 71a and 63a from the pit end equipment 21 and front panel controls 10. Information flows at 71b to the sequencer (that includes a clock and appropriate control circuitry) from pit end equipment 21, and at 63b from the front panel controls. Information flows at 127 from the computation means 120 to output gates 128, the latter also receiving sequencing instructions at 129 from the sequencer 126 and information at 130 from the memory 124. Finally, information is fed to the printer 15 at 131 from the output gates 128. The computer elements may be mechanized in accordance with known computer engineering procedures and principles.

As will appear from the above, the system may be used for open bowling (using the same lane throughout a game) or alternatively for league bowling (using alternate lanes for each frame throughout a game).

We claim:

1. For use in an automatic bowling scorekeeper, a console having a scorecard receiving zone, automatic printing apparatus carried by the console to print on the card the progressive frame-by-frame score, and means to cause the printing apparatus to print a score on the card, said means including a multiple frame display on the console, manually operable score selectors associated with the display, and a manually operable frame number selector associated with said display for selecting the number sequence of display frames, said frame number selector comprising a body having sets of frame sequence numbers thereon for display and associated electrical contacts, said means including electrical circuitry responsive to displacement of said body to cause the printer to print in scorecard frames corresponding to the selected frame number sequence.

2. For use in an automatic bowling scorekeeper, a console having a scorecard receiving zone, automatic printing apparatus carried by the console to print on the card the progressive frame-by-frame score, and means to cause the printing apparatus to print a score on the card, said means including a multiple frame display on the console, manually operable score selectors associated with the display, and a manually operable frame number selector associated with the display for selecting the number sequence of frames on said display, the score selectors including units, tens and hundreds digits selectors for one frame of the display to be manually set to a cumulatively correct score, and other score selectors which are aligned with each other and operable in time-wise uninterrupted sequence for recording pin-fall occurring subsequent to that pin-fall represented by said cumulatively correct score.

3. For use in an automatic bowling scorekeeper, a console having a scorecard receiving zone, automatic printing apparatus carried by the console to print on the card the progressive frame-by-frame score, and means to cause the printing apparatus to print a score on the card, said means including a multiple frame display on the console, manually operable score selectors associated with the display, and a manually operable frame number selector associated with said display for selecting the number sequence of frames on said display, the score selectors including units, tens and hundreds digits selectors for one frame of the display to be manually set to a cumulatively correct score, the score selectors also including two individually operable pin-fall units digit selectors for each of two additional frames of the display, the first pin-fall number selector to be set to the correct pin-fall count realized by bowling a first ball for said frame, and the second pin-fall number selector to be set to the correct total pin-fall count realized by bowling the second ball for said frame.

4. The combination of claim 3 in which the first pin-fall selector has ten positions corresponding to the units digits 1 through 9 and to a strike.

5. The combination of claim 3 in which the second pin-fall selector has ten positions corresponding to the units digits 1 through 9 and to a spare.

6. The combination of claim 3 in which the score selectors include another individually operable pin-fall units digit selector for another frame of the display, the other pin-fall number selector to be set to the correct pin-fall count realized upon bowling a first ball for said other frame of the display.

7. For use in an automatic bowling scorekeeper, a console having a scorecard receiving zone, automatic printing apparatus carried by the console to print on the card the progressive frame-by-frame score, and means to cause the printing apparatus to print a score on the card, said means including a multiple frame display on the console, and manually operable score selectors associated with the display, certain of the score selectors comprising digital switching apparatus having numbers movable into and out of display position in said multiple frame display, others of said score selectors being characterized as grouped in aligned relation and individually selectively operable in an uninterrupted sequence corresponding to a correctly determined pin-fall sequence.

8. The combination of claim 7 including a scorecard at said zone and comprising a translucent sheet having multiple rows of frame box indicia thereon, each row including ten frames.

9. The combination of claim 8 including light projection means carried by the console to project a light beam through the scorecard and toward a screen.

10. The combination of claim 9 in which said automatic printing apparatus includes a printing head, and means to effect relative movement of the printing head and scorecard for first bringing the head into printing position and then bringing the printing head into contact with the scorecard.

11. The combination of claim 10 in which said means to effect said relative movement includes a carriage for the printing head, and power mechanism to advance the carriage in two dimensions generally parallel to the surface of the scorecard and to displace the carriage in a third dimension extending generally normal to said surfaces.

12. The combination of claim 10 in which the console includes a translucent window supporting the scorecard at one side thereof during printing, said printing head is movable at the side of the scorecard opposite said window, and said light projection means is located to direct light along a path extending through said window and then through the scorecard.

13. The combination of claim 10 in which the console has a second scorecard receiving zone and two translucent windows to support the scorecards at said zones during printing, the printing head is movable at the sides of the scorecards opposite said windows, and said light projection means is located to direct light along paths extending through the windows and then through the scorecards for dual projection of two bowling team scores printed on said scorecards.

14. The combination of claim 2 in which said last named means includes a computer connected to respond to positioning of said frame number and score selectors for effecting operation of the printing apparatus.

15. The combination of claim 14 in which said computer includes a memory connected to receive signals from said score selectors for storing said cumulatively correct score, and arithmetic computation means connected to receive signals from said memory and said score selectors to compute the correct score for printing in scorecard frames corresponding to said additional frames of the display.

16. For use in an automatic bowling scorekeeper, the combination comprising a console having a scorecard receiving zone, printing apparatus carried by the console to print on the card the progressive frame-by-frame score, and means to cause the printing apparatus to print a score on the card, said means including
 (a) first selector means for manually selecting a certain frame for which the score is known to be correct,
 (b) second selector means for manually selecting the correct score corresponding to said certain frame,
 (c) and other means for manually selecting for a subsequent frame the pin-fall count resulting from first and second rolled balls, said other means including other selectors characterized as grouped in alignment and individually selectively operable in an uninterrupted sequence corresponding to a correctly determined pin-fall sequence.

17. The combination of claim 16 wherein said first selector means includes a rotor on which the frame numbers appear, and said second selector means includes individually rotatable rotors on which units, tens and hundreds digits appear.

18. The combination of claim 16 wherein said means to cause the printing apparatus to print a score on the card includes a computer and circuitry connectible to transmit to the computer signals generated in response to manual operation of said first and second selector means and said other means.

19. The combination of claim 18 wherein said first and second selector means include rotors, and said circuitry includes switching structure operated in response to rotation of said rotors.

20. The combination of claim 16 including another selector connected to be manually operated by an individual player for effecting score printing in card frames corresponding to said player.

References Cited
UNITED STATES PATENTS

| | | |
|---|---|---|
| 3,124,355 | 3/1964 | Mentzer et al. |
| 3,202,803 | 8/1965 | Markstrom _____ 273—43 X |
| 3,295,849 | 1/1967 | Miller et al. |
| 3,295,439 | 1/1967 | Miller et al. |
| 3,375,352 | 3/1968 | House et al. |

ANTON O. OECHSLE, Primary Examiner

U.S. Cl. X.R.

235—92